US011423132B2

(12) United States Patent
Sim et al.

(10) Patent No.: US 11,423,132 B2
(45) Date of Patent: Aug. 23, 2022

(54) ELECTRONIC DEVICE AND METHOD FOR CONTROLLING THE SAME

(71) Applicant: LG ELECTRONICS INC., Seoul (KR)

(72) Inventors: Sooyoung Sim, Seoul (KR); Kokeun Kim, Seoul (KR); Beomoh Kim, Seoul (KR); Sungjin Kim, Seoul (KR); Jihye Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 352 days.

(21) Appl. No.: 16/489,668

(22) PCT Filed: May 13, 2019

(86) PCT No.: PCT/KR2019/005697
§ 371 (c)(1),
(2) Date: Aug. 28, 2019

(87) PCT Pub. No.: WO2020/230913
PCT Pub. Date: Nov. 19, 2020

(65) Prior Publication Data
US 2021/0334346 A1    Oct. 28, 2021

(51) Int. Cl.
*G06F 21/32*    (2013.01)
*G06K 9/00*    (2022.01)
(Continued)

(52) U.S. Cl.
CPC .............. *G06F 21/32* (2013.01); *G06F 21/45* (2013.01); *G06V 40/13* (2022.01); *G06V 40/161* (2022.01)

(58) Field of Classification Search
CPC ..... G06F 21/32; G06F 21/45; G06K 9/00013; G06K 9/00892; G06K 9/00067
See application file for complete search history.

(56) References Cited

U.S. PATENT DOCUMENTS

2007/0260887 A1* 11/2007 Ito .......................... G07C 9/257
713/186
2012/0221863 A1* 8/2012 Osaka ..................... G06F 21/34
713/189

(Continued)

FOREIGN PATENT DOCUMENTS

JP    2003050783    2/2003
JP    2012037942    2/2012
(Continued)

OTHER PUBLICATIONS

PCT International Application No. PCT/KR2019/005697, Notification of Transmittal of the International Search Report and the Written Opinion of the International Searching Authority, or Declaration dated Feb. 12, 2020, 9 pages.

*Primary Examiner* — Bobbak Safaipour
*Assistant Examiner* — Duy Tran
(74) *Attorney, Agent, or Firm* — Lee Hong Degerman Kang Waimey

(57) ABSTRACT

An electronic device capable of performing multimodal biometric authentication, where a comparison group is first formed after performing a user authentication with low precision, and then a user authentication is performed with high precision using the formed comparison group, such that the precision of the user authentication and a speed of the user authentication can be both increased.

6 Claims, 9 Drawing Sheets

(51) Int. Cl.
*G06F 21/45* (2013.01)
*G06V 40/13* (2022.01)
*G06V 40/16* (2022.01)

(56) References Cited

U.S. PATENT DOCUMENTS

| | | | | |
|---|---|---|---|---|
| 2012/0304267 | A1* | 11/2012 | Yamada | G06V 40/70 |
| | | | | 726/7 |
| 2013/0251216 | A1* | 9/2013 | Smowton | G06V 40/67 |
| | | | | 713/150 |
| 2017/0193208 | A1* | 7/2017 | Ashley | G06F 21/32 |
| 2017/0353448 | A1* | 12/2017 | Sarin | H04L 63/0861 |

FOREIGN PATENT DOCUMENTS

| | | |
|---|---|---|
| KR | 1020180041016 | 4/2018 |
| WO | 2018025086 | 2/2018 |

\* cited by examiner

ELECTRONIC DEVICE AND METHOD FOR CONTROLLING THE SAME

CROSS-REFERENCE TO RELATED APPLICATIONS

This application is the National Stage filing under 35 U.S.C. 371 of International Application No. PCT/KR2019/005697, filed on May 13, 2019, the contents of which are hereby incorporated by reference herein in its entirety.

TECHNICAL FIELD

The present disclosure relates to an electronic device that is capable of performing multimodal biometric authentication.

BACKGROUND ART

With development of technologies, the functions of electronic devices are diversified. Examples of such functions include data and voice communications, capturing images and video via a camera, recording audio, playing music files via a speaker system, and displaying images and video on a display unit. Some electronic devices include additional functionality which supports electronic game playing, while other terminals are configured as multimedia players. Specifically, the recent electronic devices may receive broadcast and multicast signals providing visual contents such as videos or television programs.

As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

A broadened range of functions of the electronic device increases the importance of user authentication for enhancing security. For this user authentication, various schemes are used such as a password scheme and a biometric authentication scheme.

The biometric authentication is among security authentication schemes and is a technology that performs user authentication using peculiar physical features of user's fingerprint, face, voice, iris, retina, blood vessel, etc. This biometric recognition technology reduces the risk of illegal use or reproduction and increases the convenience in use.

Then, the biometric authentication scheme has an advantage in terms of the difficulty of falsification due to the use of user's biometric information, but has a problem that the greater the number pieces of biometric information that are a comparison group, the longer time it takes for the user authentication. Because of this, there is a problem in that the user authentication which uses user's authentication information is realistically difficult at an airport gate through which many users pass, a payment terminal for paying an amount of payment, or the like.

Furthermore, the advantage of the user authentication scheme that uses the biometric authentication information which is difficult to falsify is widely publicized, and thus a trend is that the number of biometric information that is the comparison group is further increased.

Research has been actively made on biometric authentication schemes that are capable of performing user's authentication at a high speed using the biometric authentication information that is difficult to falsify.

DISCLOSURE

Technical Problem

An object of the present disclosure, which is made in view of the problems described above and other problems, is to provide an electronic device that is capable of performing user authentication which uses biometric authentication information at a high speed and a function in accordance with a result of the user authentication even in a case where the number of pieces of biometric information that is a comparison group is great, and a method of controlling the electronic device.

Technical Solution

In order to accomplish the objects described above or other objects, according to an aspect of the present disclosure, there is provided an electronic device that performs multimodal biometric authentication, the device including: first and second terminals each of which includes multiple sensors formed to detect biometric information and which are configured to receive different types of pieces of biometric information, respectively; a controller that selects one or several pieces of user information from among multiple preregistered pieces of user information using the biometric information which is input from the first terminal unit; and that forms a comparison group for user authentication; and a security module that compares the comparison group and the biometric information which is input from the second terminal unit and thus performs the user authentication, in which the second terminal unit receives the biometric information from a user after a predetermined time elapses from when the biometric information is input into the first terminal unit.

In the electronic device, each of the preregistered pieces of user information may include first biometric information and second biometric information different in type from the first biometric information.

In the electronic device, the controller may compare the first biometric information included in each of the multiple preregistered pieces of user information, and the biometric information that is input from the first terminal unit and thus may form the comparison group.

In the electronic device, the controller may form the comparison group during the time from when the user's biometric information is input into the first terminal unit to when the user's biometric information is input into the second terminal unit.

In the electronic device, in a case where the user is positioned within a predetermined distance from the second terminal unit, the first terminal unit may receive the biometric information, as an input, from the user.

In the electronic device, in a case where the user within the predetermined distance from the second terminal unit moves toward the second terminal unit and where the movement is detected, the first terminal unit may receive the biometric information, as an input, from the user.

In the electronic device, in a case where the user is positioned within the predetermined distance from the second terminal unit, the first terminal unit may capture an image of the user, and the controller may extract a facial image from the image of the user and may form the comparison group using the extracted facial image.

In the electronic device, in a case where the formation of the comparison group is not completed during the time from when the user's biometric information is input into the first terminal unit to when the user's biometric information is input into the second terminal unit, the security module may compare the user information selected during the time from when the user's biometric information is input into the first terminal unit to when the user's biometric information is input into the second terminal unit, and the biometric information that is input into the second terminal unit, and then may compare the user information selected during the time from when the user's biometric information is input into the second terminal unit to when the formation of the comparison group is completed, and the biometric information that is input into the second terminal unit.

Advantageous Effect

Effects of an electronic device according to the present disclosure and of a method of controlling the electronic device is described as follow.

According to at least one of the embodiments of the present disclosure, a comparison group is first formed after performing user authentication with low precision, and then the user authentication is performed with high precision using the formed comparison group. Because of this, the precision of the user authentication and a speed of the user authentication can be both increased.

MODES FOR CARRYING OUT THE PREFERRED EMBODIMENTS

Figure 1A:
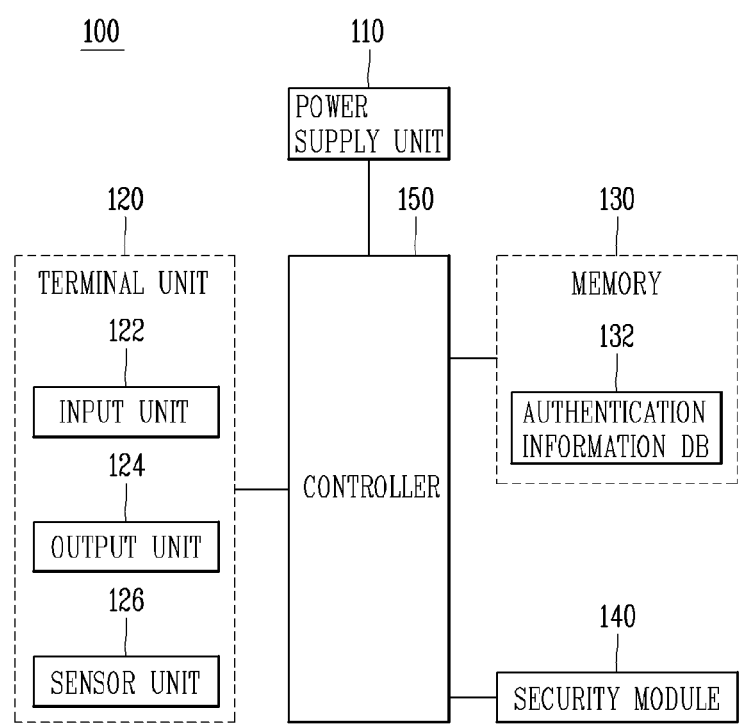
FIG. 1A is a block diagram for describing an electronic device according to the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), smart vehicles, and the like.

By way of non-limiting example only, further description will be made with reference to particular types of mobile electronic apparatuses. However, such teachings apply equally to other types of terminals, such as those types noted above. In addition, these teachings may also be applied to stationary electronic apparatuses such as digital TV, desktop computers, digital signage, and the like.

Figure 1B:
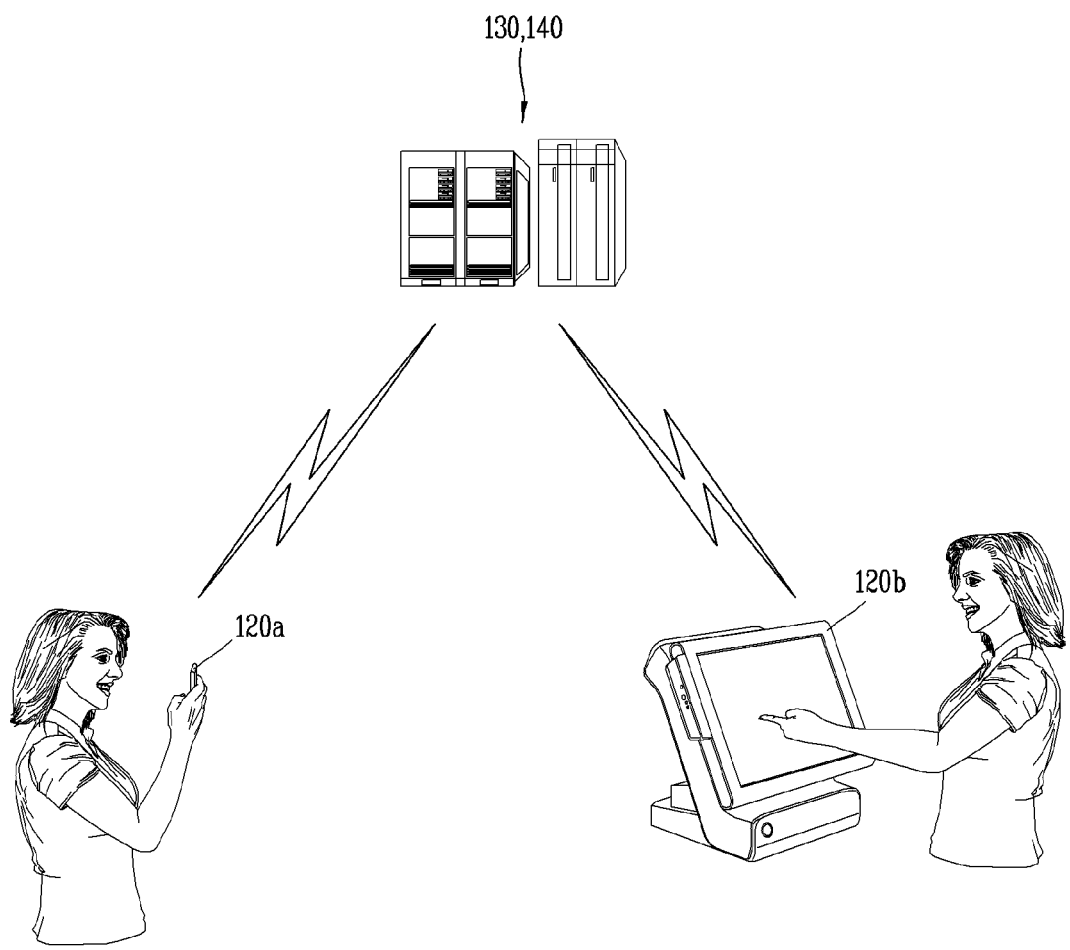
FIG. 1B is a conceptual diagram illustrating an example in which biometric information acquired from a user is registered with the electronic device according to the present disclosure and in which user authentication is performed according to the registered biometric information.

FIG. 1A is a block diagram for describing an electronic device according to the present disclosure. Then, FIG. 1B is a conceptual diagram illustrating an example in which biometric information acquired from a user is registered with the electronic device according to the present disclosure and in which user authentication is performed according to the registered biometric information.

With reference to FIG. 1, the electronic device according to the present disclosure includes power supply unit 110, a terminal unit 120, a memory 130, a security module 140, a controller 150, and so on. Constituent elements that are illustrated in FIG. 1 are not essential in implementing an electronic device, and thus an electronic device that is not described in the present specification may include constituent elements in addition to the constituent elements described above or may include one or more of the constituent described above.

More specifically, the terminal unit 120 includes at least one module for receiving information, as an input, from a user. For example, the terminal unit 120 includes a camera or an image input unit for inputting an image signal, a microphone or audio input unit for inputting an audio signal, and a key input unit (for example, a touch key, a mechanical key, or a touch screen). The modules for receiving an input from the user are hereinafter collectively referred to as an input unit 122.

In addition, the terminal unit 120 includes at least one module for generating an output associated with a sense of sight, a sense of hearing, or the like. As an example, the terminal unit 120 includes at least one of a display unit, an audio output unit, and an optical output unit. The display unit here is structurally layered with the touch sensor or is formed to be integrally combined with the touch sensor in order to implement a touch screen. The touch screen functions as an input interface between an electronic 100 and the user and at the same time functions as an output interface between the electronic device 100 and the user. At least one module that generates the output associated with the sense of sight, the sense of hearing, or the like is hereinafter referred to an output unit 124.

In addition, the terminal unit 120 includes at least one biometric sensor for acquiring the biometric information from the user. As an example, the biometric sensor includes at least one of a fingerprint sensor, an iris sensor, a facial recognition sensor, a photoplethysmography sensor (PPG), and a voice sensor. The biometric sensor acquires the biometric information (information on a fingerprint, an iris, a facial image, a heart rate, or the like) from the user. At least one biometric sensor is hereinafter referred to as a sensor unit 126.

On the other hand, an electronic device 100 according to the embodiment of the present disclosure includes at least one terminal unit 120. As an example, each of the terminal units 120 is connected to a controller 150 and transfers user information that is input from the input unit 122 and the biometric information that is acquired from the sensor unit 126 to the controller 150. In addition, under the control of the controller 150, image information or audio information is output through the output unit 124.

On the other hand, of course, as illustrated in FIG. 1B, the terminal unit 120 may be connected to the controller 150 from a long distance or a short distance, using a preset communication scheme. As an example, the terminal unit 120 is connected to the controller 150, using a short-distance communication scheme, such as Bluetooth (BT) or near-field communication (NFC), a wireless Internet scheme, such as Wireless LAN (WLAN) or Wireless-Fidelity (Wi-Fi), a mobile communication scheme, such as Global System for Mobile Communication (GSM), Code Division Multiple Access (CDMA), Long Term Evolution (LTE), Long Term Evolution-Advanced (LTE-A), or a 5G network (a new radio or a MilliMeter (MM) wave), or the like. To do this, although not illustrated, each terminal unit 120 includes a communication unit (not illustrated) for communication with the controller 150.

On other hand, the terminal unit 120 is connected to the controller 150 for communication, and the terminal units 120 include various electronic devices each of which includes the input unit 122, the output unit 124, and the sensor unit 126.

An example of the terminal unit 120 is a mobile terminal of the user. In this case, a touch screen and a speaker of the mobile terminal is the output unit 124, and a keypad (or a touch key pad) or the like is the input unit 122. In addition, a camera, a fingerprint recognition sensor, or the like that is capable of recognizing the iris or face of the user, which is provided in the mobile terminal, is the sensor unit 126. Furthermore, the terminal unit 120 may be a terminal that is installed at an immigration checkpoint or the like in an airport or may be a payment terminal (for example, a point-of-sales (POS) terminal).

As illustrated in FIG. 1B, each of the mobile terminal of the user and the payment terminal is accordingly connected, as the terminal unit 120, to the controller 150.

In this case, the user inputs the biometric information through the mobile terminal. In this case, the mobile terminal is used as a registration terminal 120a for registering the biometric information. Then, user's biometric information that is input through the registration terminal 120a is transferred to the controller 150. Then, the controller 150 stores the biometric information in a biometric information database in the memory 130 and performs registration of the biometric information.

On the other hand, in a case where, for payment, the user inputs the biometric information into any other POS terminal, that POS terminal is used as an authentication terminal 120b that performs user authentication, based on the biometric information that is input. Then, the authentication terminal 120b senses user's biometric information, and performs the user authentication based on the sensed biometric information and the biometric information preregistered in the biometric information database in the memory 130. Then, according to a result of the user authentication, a requested function (for example, a payment function) is performed.

On the other hand, pieces of data that are used for various functions of the electronic device 100 are stored in the memory 130. Many application programs (or applications) that run on the electronic device 100 and pieces of data and command for operations of the electronic device 100 are stored in the memory 130. At least one or several of these application programs is downloaded from an external server through wireless communication. At least one or several of these application programs are preinstalled on the electronic device 100 before shipment such that basic functions (for example, functions of receiving and making a call and functions of receiving and transmitting a message) of the electronic device 100) are performed. On the other hand, the application program is stored in the memory 130. Then, the application program is installed on the electronic device 100 and runs by the controller 150 to perform the operation (or the function) of the electronic device.

In addition, an authentication information database 132 in which information associated with biometric authentication is stored is included in the memory 130. At least one piece of biometric information and user's personal information that are input from a registration terminal 120a, and personal identification information (for example, PIN information) are stored in the authentication information database 132 here.

On the other hand, the authentication information database 132 is a database in which different users' preregistered pieces of biometric information are categorized according to a preset string of characters and then are stored. The string of characters here is personal identification information (PIN information) that is input from each of the users. That is, the different users' preregistered pieces of biometric information are grouped into groups according to the PIN information that are input from the users, that is, a string of numbers, and are stored in the authentication information database 132.

In this case, if strings of numbers that make up the PIN information that is input are the same or similar, that strings of numbers, although they are different users' pieces of biometric information, are grouped into one group, and the resulting one group is stored. At this point, in the case where the strings of numbers that make up the PIN information are the same, this means that numbers that make up the PIN information are all the same in arrangement. In addition, in the case where the strings of numbers are similar, this means that a preset number of numbers or greater which are among the numbers that make up the PIN information are the same in arrangement.

On the other hand, normally, the controller 150 controls general operations of the electronic device 100. The controller 150 may provide or process information or functions appropriate for a user by processing signals, data, information and the like, which are input or output by the aforementioned various components, or activating application programs stored in the memory 130.

Also, the controller 150 may control at least some of the components illustrated in FIG. 1A, to execute an application program that have been stored in the memory 130. In addition, the controller 150 may control a combination of at least two of those components included in the electronic device 100 to activate the application program.

In a case where a request is made for registration of the biometric information through the registration terminal 120a, the controller 150 receives the biometric information that is sensed in the registration terminal 120a. The registration terminal 120a here means an electronic device that is connected to the controller 150 for the registration of the biometric information. Therefore, in a case where the user connects his/her mobile terminal to the controller 150 for the registration of the biometric information, the mobile terminal of the user is the registration terminal 120a.

In addition, in a case where a request is made for authentication of the biometric information through the authentication terminal 120b, the controller 150 receives the biometric information that is sensed in the authentication terminal 120b. The authentication terminal 120b here means an electronic device that is connected to the controller 150 for the user authentication. Therefore, in a case where the POS terminal for payment is connected to the controller 150, the POS terminal is the authentication terminal 120b.

On the other hand, the controller 150 forms a comparison group with which the biometric information that is input through the authentication terminal 120b, which is among preregistered pieces of user information, is to be compared.

Then, the controller 150 controls the security module 140 such that the user authentication is performed on only currently-set biometric authentication comparison group, which is among pieces of biometric information stored in the authentication information database 132. Then, the security module 140 performs the user authentication on the biometric information acquired through the authentication terminal 120b and on the currently-set biometric authentication comparison group using a preset algorithm.

The security module 140 controls an operation associated with the user authentication, which are among the operations of the electronic device. For example, when a biometric authentication function is performed, the security module 140 performs control associated with the biometric authentication. For example, the security module 140 performs the biometric authentication using an artificial neural network algorithm and a support vector machine (SVM) algorithm, which are algorithms for the biometric authentication. Besides, the security module 140 operates a fuzzy logic, a Dempster-Shafer theory, a SVM, a relevance vector machine (RVM) mean rule, a Monte Carlo approach, phase stretch transform (PST), an artificial neural network, a principal component analysis, Fisher faces, wavelet and elastic matching, and so on, which are algorithms for the biometric authentication.

The security module 140 transmits and receives data through communication with the controller 150 and thus controls general operations of the electronic device. For example, the controller 150 receives data that results from the user authentication, from the security module 140, and based on this data, controls the operations of the electronic device. In addition, the security module 140 receives a control command for performing the biometric authentication from the controller 150 and accordingly performs the biometric authentication.

On the other hand, in FIG. 1A, a configuration is illustrated in which the security module 140 and the controller 150 are separated from each other, but the present disclosure is not limited to this. A configuration may be employed in which the security module 140 is one portion of the controller 150.

Various embodiments described herein may be implemented in a computer-readable medium, a machine-readable medium, or similar medium using, for example, software, hardware, or any combination thereof.

Figure 2:
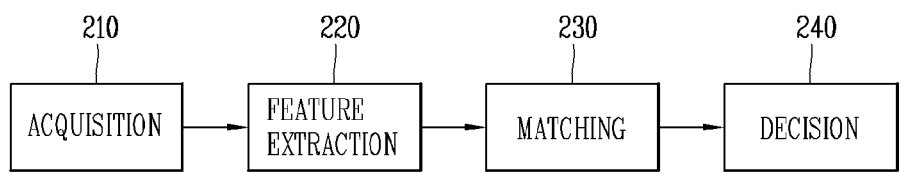
FIG. 2 is a conceptual diagram for a single biometric authentication scheme.

A method of performing the biometric authentication in the electronic device described with reference to FIG. 1A will be described in detail below. FIG. 2 is a conceptual diagram for describing a unimodal biometric authentication scheme.

Referring to FIG. 2, unimodal biometric authentication includes an acquisition step 210, a feature extraction step 220, a matching step 230, and a decision step 240.

In the acquisition step 210, biometric recognition information is acquired through a biometric sensor. Pieces of biometric recognition information include pieces of user-specific biometric information such as fingerprint information, facial information, voice information, vein information, iris information, and the like.

In the feature extraction step 220, features of the biometric recognition information are extracted. The feature is information for recognizing a specific characteristic that varies from one person to another. For example, in the case of the fingerprint, a specific pattern of a fingerprint is set as a feature. This feature is differently set depending on biometric authentication schemes.

In the matching step 230, a matching score between preregistered user information and detected biometric recognition information may be calculated. The preregistered user information is biometric information that is stored in advance by the user before performing the biometric authentication. The user stores in advance the fingerprint information, the facial information, the voice information, the vein information, the iris information, and so on in the form of template in the memory 130.

The matching score refers to a score indicating similarity between the preregistered user information and the biometric recognition information. Various algorithms that are known in the related art are used as algorithms for calculating the matching score.

In the decision step 240, the user authentication is performed using the matching score and a decision function. The decision function is a function that serves as a reference for determining whether or not the user who inputs the biometric recognition information is a genuine user or an imposter user. The decision function may be set as a specific threshold or may be set as a multi-dimensional function.

An initial setting value (default value) may be set, by a manufacturer of a biometric authentication function, for the decision function. In addition, the initial setting value for the decision function may be changed using user's pieces of biometric recognition information, which are detected through biometric sensors. Therefore, the more the electronic device performs biometric recognition operation, the more the speed and the precision of the biometric recognition are improved.

In addition, decision functions may be generated differently from each other according to pieces of information that are used for generating the decision functions. Then, multiple decision functions that are generated differently from each other may be stored in the memory 130. For example, a decision function may be generated with only the matching score or may be generated using the matching score and a spoofing score. In this case, two decision functions may be both stored in the memory 130, and, whenever necessary, the biometric authentication may be performed using one of the two decision functions.

The unimodal biometric authentication scheme has been described above. A multimodal biometric authentication scheme will be described below. FIGS. 3A to 3D are conceptual views illustrating a multimodal biometric authentication scheme.

Multimodal biometric authentication may be categorized into 4 types according to when multiple pieces of biometric recognition information are fused. The term fusion is used to mean an operation of combing multiple pieces of information into one piece of information according to a preset algorithm and may be used interchangeably with the terms combination, integration, fusion, matching, and so on.

Figure 3A:
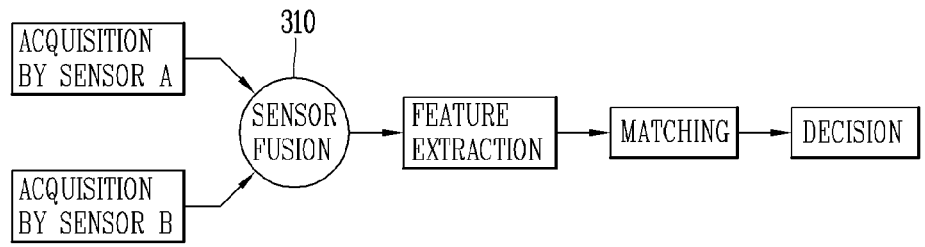
FIGS. 3A to 3D are conceptual diagrams for describing a multimodal biometric authentication scheme.

FIG. 3A illustrates a sensor fusion scheme 310. The sensor fusion scheme 310 is a scheme for combining multiple pieces of biometric recognition information that are acquired from different sensors in the step of acquiring the biometric recognition information. Specifically, the sensor fusion scheme is a scheme for fusing pieces of biometric recognition information sensed by different biometric sensors and extracting a feature from information that results from the fusion.

Figure 3B:
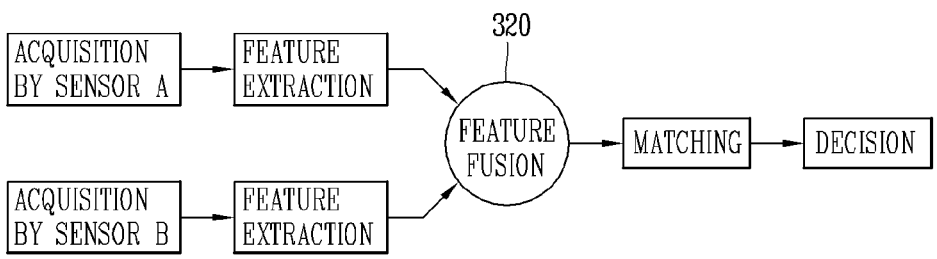

FIG. 3B illustrates a feature fusion scheme 320. The feature fusion scheme 320 is a scheme for extracting a feature from each of the multiple pieces of biometric recognition information acquired from the different biometric sensors in the feature extraction step and combining the extracted features.

Figure 3C:
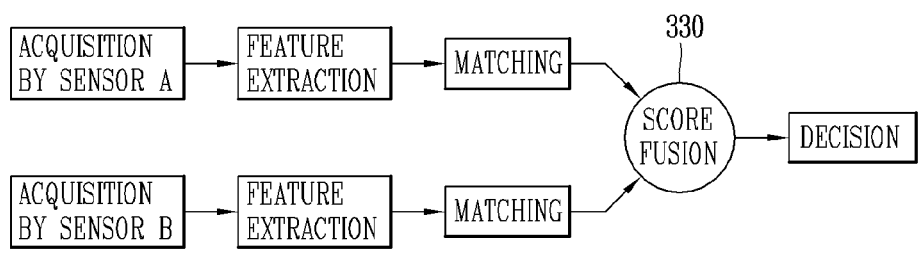

FIG. 3C illustrates a score fusion scheme 330. The score fusion scheme 330 is a scheme for combining matching scores that are calculated for the multiple pieces of biometric recognition information, respectively, in the step of matching pieces of biometric recognition information.

Figure 3D:
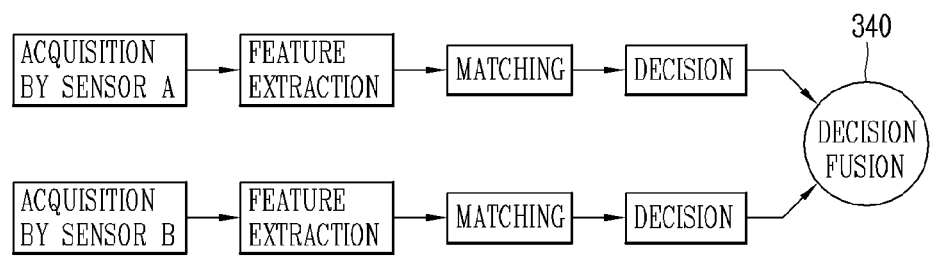

FIG. 3D illustrates a decision fusion scheme 340. The decision fusion scheme 340 is a scheme for combining results of decision that are calculated for the multiple pieces of biometric recognition information, respectively, in the step of deciding the biometric recognition information.

Figure 4A:
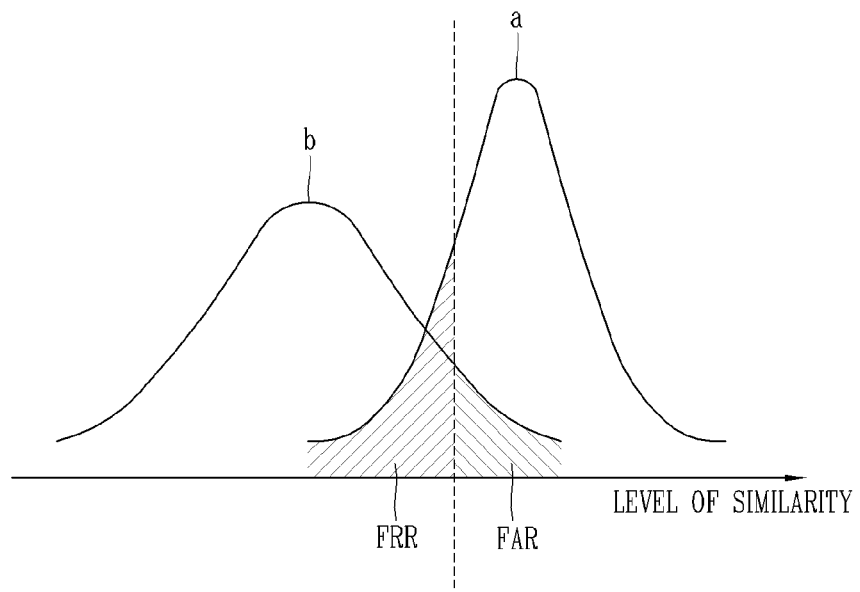
FIGS. 4A and 4B are graphs associated with an error rate of decision of biometric authentication.
Figure 4B:
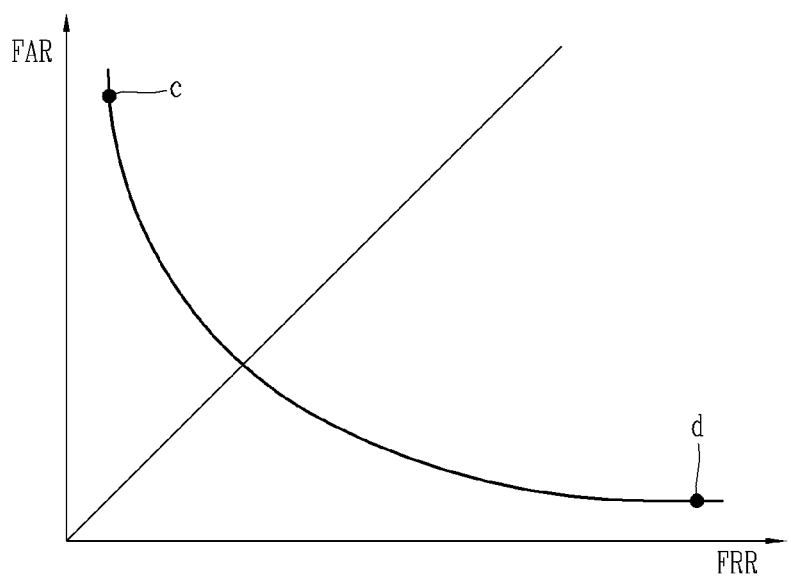

The various schemes for the multimodal biometric authentication have been described above. An error rate of the biometric recognition associated with the function of decision when performing the user authentication through the biometric authentication will be described below. FIGS. 4A and 4B are graphs associated with an error rate of decision of the biometric authentication.

Graph a in FIG. 4A is a graph illustrating distribution of levels of similarity between genuine user's biometric information and the preregistered user information, when performing the biometric authentication. Graph b in FIG. 4A is a graph illustrating distribution of levels of similarity between imposter's biometric information and the preregistered user information.

There is a portion of overlap between Graph a and Graph b. In a case where a level of similarity that is higher than a threshold indicated by a dot line aa' is reached, the electronic device 100 determines that the user is a genuine user. In a case where the level of similarity is lower than the threshold, the electronic device 100 determines that the user is an imposter. The threshold here may be a value that is decided by a provider that provides the biometric authentication function, and means the decision function described above.

On the other hand, a false rejection rate (FRR) that is illustrated in FIG. 4A refers to a rate at which the genuine user is determined as an imposter user. The higher the FRR, the higher the threshold. This decreases the probability that the user who inputs the biometric recognition information will be determined as a genuine user. Because of this, the level of security of the biometric authentication increases. The lower the FRR, the lower the threshold. This increases the probability that the user who inputs the biometric recognition information will be determined as a genuine user. Because of this, the level of security of the biometric authentication decreases.

A false acceptance rate (FAR) refers to a rate at which the imposter is determined as a genuine user. The concept of the FAR is opposite to that of the FRR. The higher the FAR, the lower the threshold. This increases the probability that the user who inputs the biometric recognition information will be determined as a genuine user. Because of this, the level of security of the biometric authentication decreases.

FIG. 4B is a graph illustrating a relationship between the FRR and the FAR. The FRR and the FAR are inversely proportional to each other. A threshold that corresponds to an area d where the FRR is high and the FAR is low is used for applications that provide a low authentication speed but require a high degree of security. For example, the threshold that corresponds to this area is set for a payment application and a bank application for strictly determining the genuine user. Conversely, a threshold that corresponds to an area c where the FRR is low and the FAR is high is used for applications that provide a high authentication speed and require a low level of security. For example, the threshold that corresponds to this area is used for an unlocking function and so on. In this manner, a threshold (that is, the decision function) of the biometric authentication function is decided considering a level of security of each of the functions that are to be performed through the biometric authentication. The parameters relating to the errors that results when performing the biometric authentication are described above.

An algorithm that is used for the score fusion scheme that is among the multimodal biometric authentication schemes will be described below.

For the score fusion scheme, various artificial intelligence algorithms for combining matching scores are used. Algorithms that are used for the score fusion scheme may include combination-based score fusion algorithms, classifier-based score fusion algorithms, density-based score fusion algorithms, and so on.

The combination-based score fusion algorithms may include a statistical rule, dynamic weighting, triangular norms, and so on. The classifier-based score fusion algorithms may include a support vector machine (SVM), Ada-Boost (RS-ADA), Dampster-Shafer (DS) and so on. The density-based score fusion algorithms may include a likelihood feature (LF) and so on.

Besides, according to the present disclosure, various algorithms and so on that are known in the related art are used for the score fusion scheme, and descriptions thereof are omitted in order not to depart from the nature and gist of the present disclosure.

The constituent elements mentioned above will be described in detail below with reference to FIG. 1A before describing various embodiments that are implemented through the electronic device 100 described above.

Embodiments associated with a control method that is implemented in the electronic device which is configured in this manner will be described in detail below with reference to the accompanying drawings. It is apparent to a person of ordinary skill in the art that the present disclosure can be implemented in specific forms within the scope that does not depart from the nature and gist of the present disclosure and from the essential features of the present disclosure.

Figure 5:
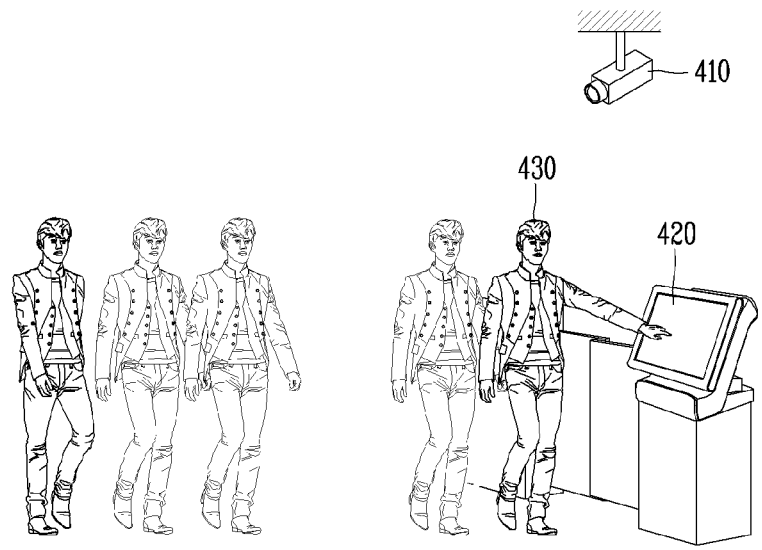
FIG. 5 is a conceptual diagram illustrating a process in which the user authenticates his/her biometric information in the electronic device according to the present disclosure.
Figure 6:
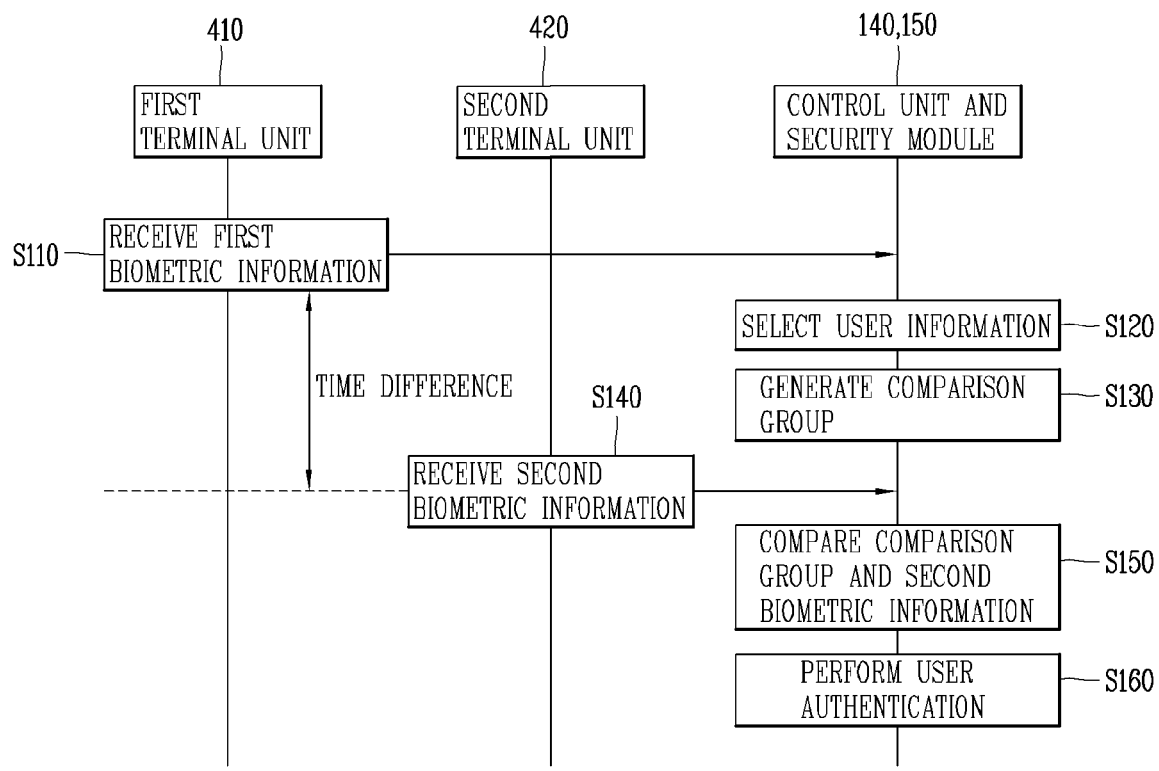
FIG. 6 is a flowchart illustrating the process in which the user authenticates his/her biometric information in the electric device according to the present disclosure.

FIG. 5 is a conceptual diagram illustrating a process in which the user authenticates his/her biometric information in the electronic apparatus according to the present disclosure. FIG. 6 is a flowchart illustrating the process in which the user authenticates his/her biometric information in the electronic apparatus according to the present disclosure.

With reference to FIG. 5, the electronic device according to the present disclosure includes a first terminal unit 410 and a second terminal unit 420. The first and second terminal units 410 and 420 all correspond to the authentication terminal unit described above.

Each of the first and second terminal units 410 and 420 includes multiple sensors for detecting the user's biometric information. The first and second terminal units 410 and 420 are configured to receive different types of biometric information, respectively. For example, the first terminal unit 410 is configured to receive a user's facial image as an input, and the second terminal unit 420 is configured to receive a user's fingerprint image as an input. For convenience in description, in the present specification, biometric information that has the same type as the biometric information that is input from the first terminal unit 410 refers to first biometric information, and biometric information that has the same type as the biometric information that is input from the second terminal unit 420 refers to second biometric information.

A brief description of a biometric authentication process according to the present disclosure is that the user 430 approaches the second terminal unit 420 for the biometric authentication. During the time it takes for the user 430 to physically approach the second terminal unit 420, the first terminal unit 410 collects the user's biometric information and shortens the time it takes for the second terminal unit 420 to perform the biometric authentication, using the collected biometric information.

Specifically, with reference to FIG. 6, the first terminal unit 410 is described as receiving the first biometric information, as an input, from the user (S110). A point in time at which the first terminal unit 410 to starts to receive the biometric information, as an input, from the user will be described below.

The first terminal unit 410 transfers the first biometric information, which is input, to the controller 140. Using the biometric information that is input from the first terminal unit 410, the controller 140 selects one or several pieces of user information from among multiple preregistered pieces of user information.

The multiple preregistered pieces of user information here include the biometric information that is input when multiple users register their respective pieces of user information with the electronic device according to the present disclosure. In an embodiment, the user information may include the first biometric information and the second biometric information. For example, the user information includes the user's facial image and fingerprint image.

The controller 140 selects one or several pieces of user information from among the multiple preregistered pieces of user information (S120). Specifically, in a case where the first biometric information is received from the first terminal unit 410, the control unit 140 compares the first biometric information included in each of the multiple preregistered pieces of user information and the first biometric information received from the first terminal unit 410, and decide whether or not to make a selection.

At this time, the controller 140 does not select the user information including the biometric information that is the same as the biometric information received from the first terminal unit 410, and selects the user information including the biometric information received from the first terminal unit 410 and the biometric information that has a level of similarity which is at or above a preset threshold.

The controller 140 decides whether or not each of the pieces of user information each of which includes the first biometric information is selected from among the preregistered pieces of user information and then generates the comparison group (S130).

The greater the magnitude of the threshold, the more time it takes to form the comparison group, but the number of pieces of user information that are included in the comparison group is small. Conversely, the smaller the magnitude of the threshold, the less time it takes to form the comparison group, but the number of pieces of user information that are included in the comparison group is great.

In a case where the controller 140 forms the comparison group, the security module 150 compares the comparison group and the biometric information that is input into the second terminal unit 420 (S150) and performs the user authentication (S160).

At this time, the second terminal unit 420 receives the biometric information, as an input, from the user, after a predetermined time elapses from when the biometric information is input into the first terminal unit 410. That is, the first and second terminal units 410 and 420 receive the biometric information, as an input, from the user, with a time lag in between.

According to the present disclosure, with the time lag, the time it takes from the second terminal unit 420 to perform the biometric authentication is shortened. Specifically, the controller 140 forms the comparison group during the time from when the user's biometric information is input into the first terminal unit 410 to when the user's biometric information is input into the second terminal unit 420.

It takes a long time for the controller 140 to compare the biometric information that is input into the second terminal unit 420 and each of all the preregistered pieces of user information. According to the present disclosure, during the time when the user approaches the second terminal unit 420 that is a widely-used biometric authentication means, one or several pieces of user information are selected from among the preregistered pieces of user information, and the user authentication is performed, only using the selected biometric information and the biometric information that is input into the second terminal unit 420. Thus, the time taken for the biometric authentication can be shortened.

On the other hand, the security module 150 determines whether or not two pieces of biometric information are the same, with higher precision than does the controller 140. Specifically, in a case where biometric information included in specific user information has a level of similarity to the biometric information received from the first terminal unit 410, which is at or above the threshold, the controller 140 causes the specific user information to be included in the comparison group. However, only in a case where the biometric information included in the specific user information is exactly the same as the biometric information received from the second terminal unit 420, the security module 150 performs the user authentication.

On the other hand, with a threshold higher than the threshold described above, it is determined whether or not there is similarity between the biometric information included in the user information, and the biometric information received from the second terminal unit 420, and the user authentication is performed according to a result of the determination.

On the other hand, in a case where the preregistered pieces of user information are many or where a short time elapses from when the user inputs the biometric information into the first terminal unit 410 to when the user inputs the biometric information into the second terminal unit 420, the controller 140 cannot complete the generation of the comparison group described above during the time from when the user's biometric information is input into the first terminal unit 410 to when the user's biometric information is input into the second terminal unit 420.

In this case, according to the present disclosure, a method of shortening the time taken for the biometric authentication is also provided.

Figure 7:
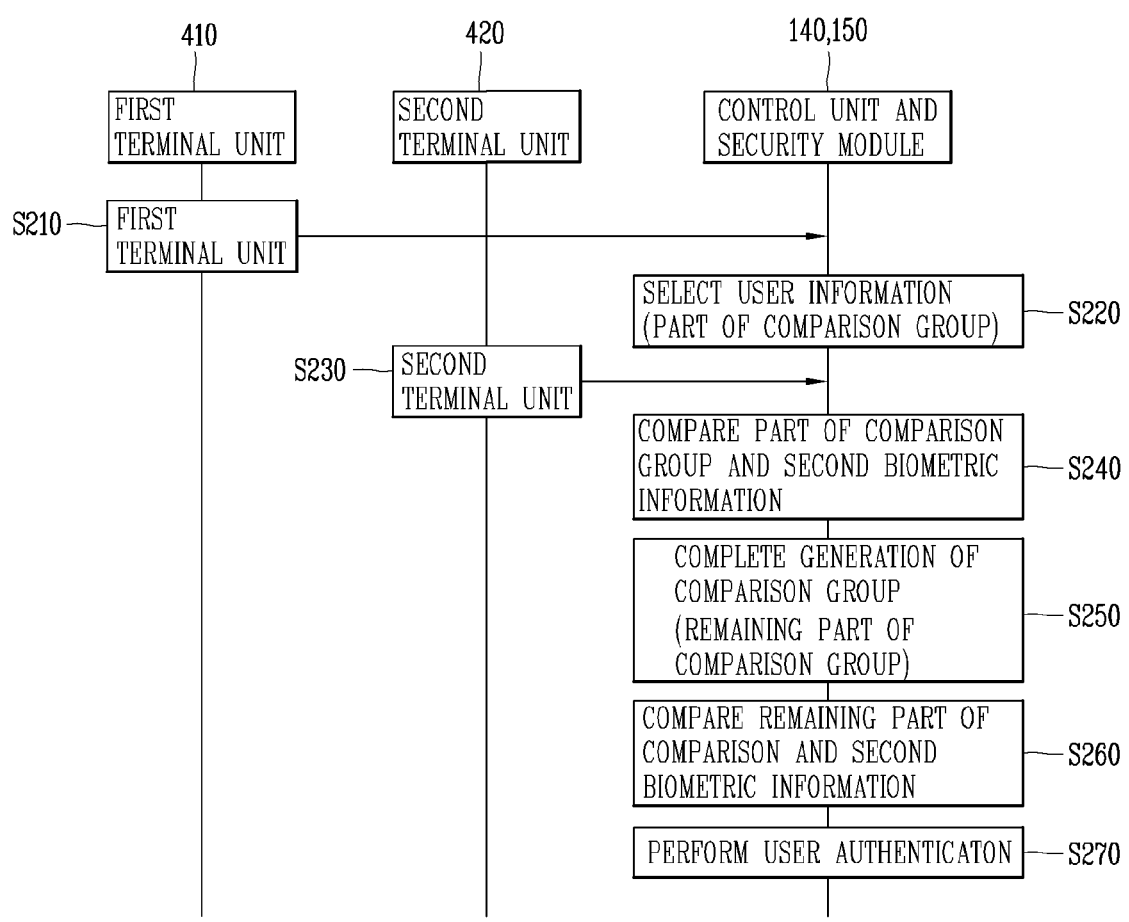
FIGS. 7 and 9 are flowcharts each illustrating a process in which the user authenticates his/her biometric information in an electric device according to another embodiment of the present disclosure.
Figure 8:
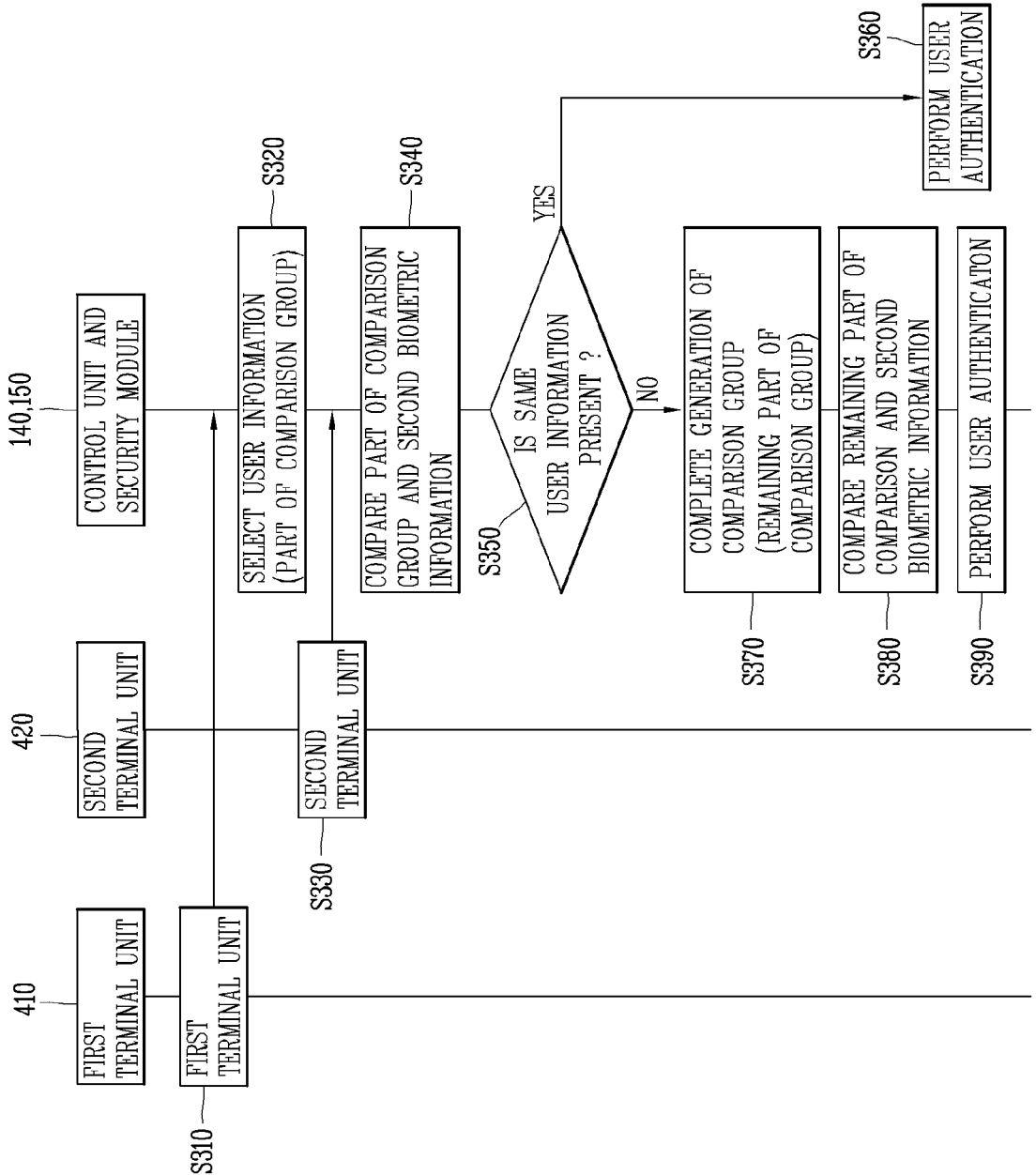

FIGS. 7 and 8 are flowcharts each illustrating a process in which the user authenticates his/her biometric information in an electric device according to another embodiment of the present disclosure.

With reference to FIG. 7, in a case where the formation of the comparison group is not completed during the time from when the user's biometric information is input into the first terminal unit 410 (S210) to when the user's biometric information is input into the second terminal unit 420 (S230), the security module 150 compares the user information (a part of the comparison group) selected (S220) during the time from when the user's biometric information is input into the first terminal unit 410 to when the user's biometric information is input into the second terminal unit 420 and the biometric information that is input into the second terminal unit 420 (S240). Subsequently, when the controller 140 completes the generation of the comparison group (S250), the security module 150 compares the user information selected during the time from when the user's biometric information is input into the second terminal unit 420 to when the formation of the comparison group is completed and the biometric information that is input into the second terminal unit (S260), and performs the user authentication (S270).

On the other hand, with reference to FIG. 8, in a case where the formation of the comparison group is not completed during the time from when the user's biometric information is input into the first terminal unit 410 (S310) to when the user's biometric information is input into the second terminal unit 420 (S330), the security module 150 compares the user information (a part of the comparison group) selected (S320) during the time from when the user's biometric information is input into the first terminal unit 410 to when the user's biometric information is input into the second terminal unit 420 and the biometric information that is input into the second terminal unit 420 (S340).

At this time, in a case where the user information including the biometric information that is the same as the biometric information which is input into the second terminal unit 420 is present in the part of the comparison group, the security module 150 ends an additional information comparison and performs the user authentication (S360).

In a case where the user information including the biometric information that is the same as the biometric information which is input into the second terminal unit 420 is not discovered in the part of the comparison group, when the controller 140 completes the generation of the comparison group (S370), the security module 150 compares the user information selected during the time from when the user's biometric information is input into the second terminal unit 420 to when the formation of the comparison group is completed and the biometric information that is input into the second terminal unit (S380) and performs the user authentication (S390).

As described above, according to the present disclosure, in the case where the preregistered pieces of user information are many or where a short time elapses from when the user inputs the biometric information into the first terminal unit 410 to when the user inputs the biometric information into the second terminal unit 420, the comparison group generation process and the user authentication process are performed at the same time, during a fixed time, and thus the time taken for the biometric authentication can be shortened.

On the other hand, in a case where a predetermined condition is satisfied, the first terminal unit 410 starts to collect the biometric information.

Figure 9:
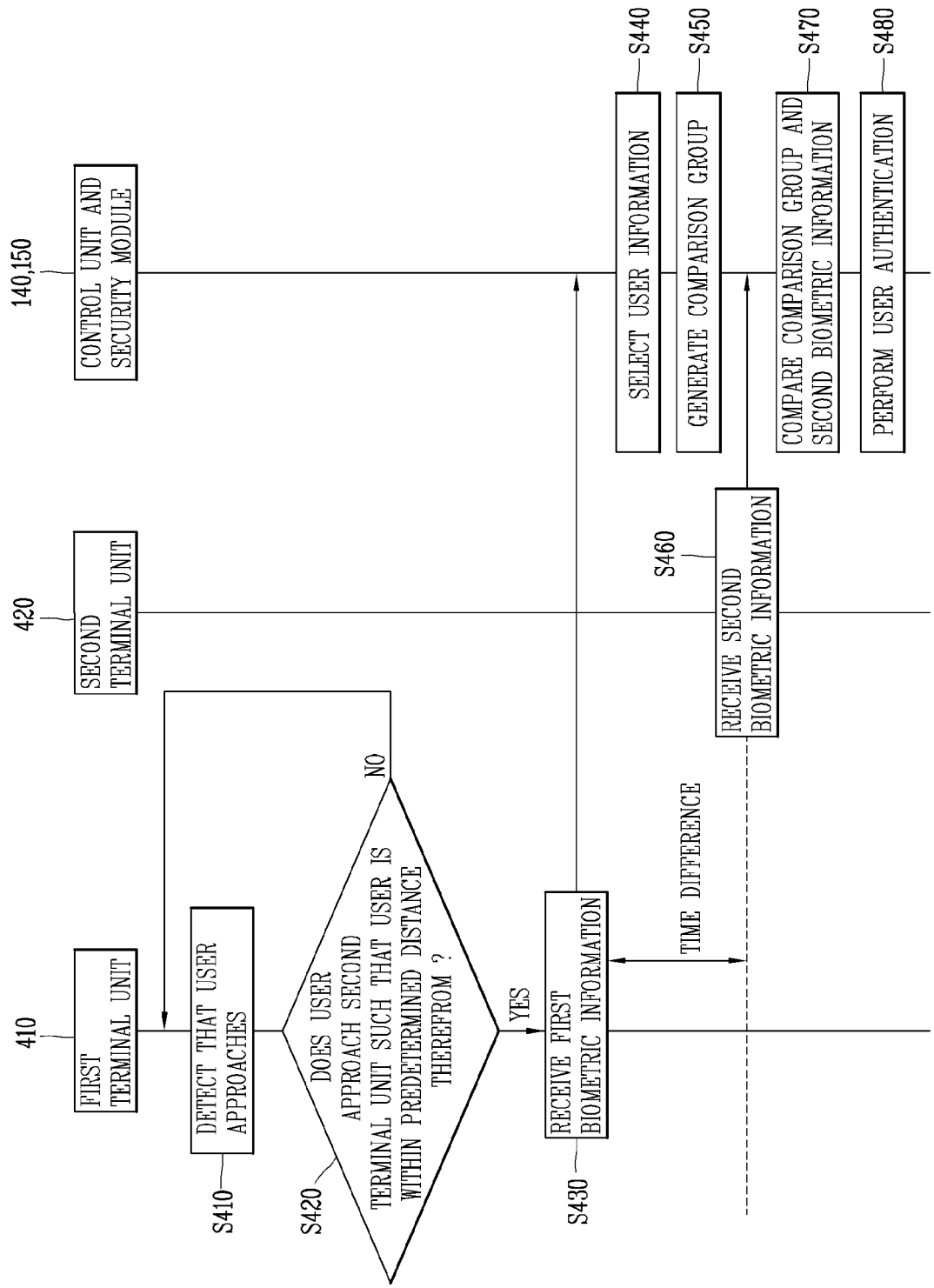
Figure 10:
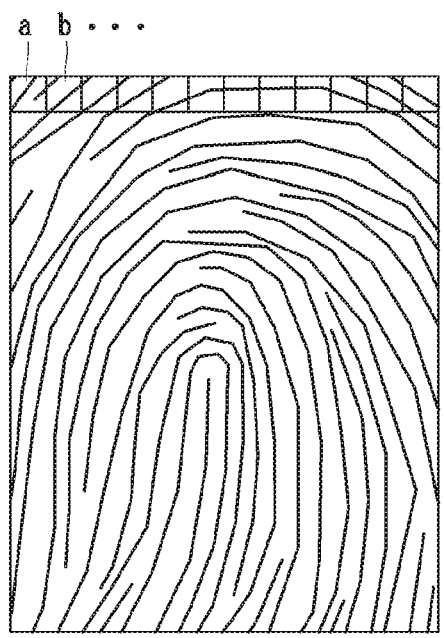

FIG. 9 is a flowchart illustrating a method in which the first terminal unit collects the biometric information in an electric device according to an embodiment of the present disclosure.

The first terminal unit 410 is configured to detect that the user approaches (S410). To do this, the first terminal unit 410 includes a sensor that senses whether or not the user is present. For example, the first terminal unit 410 includes a thermal sensor and an image sensor.

In a case where the user approaches the second terminal unit 420 such that the user is within a predetermined distance therefrom, the first terminal unit 410 starts to receive the first biometric information from the user (S430).

In another embodiment, in a case where the first terminal unit 410 detects that the user within the predetermined distance from the second terminal unit 420 moves toward the second terminal unit 420, the first terminal unit 410 receives the biometric information, as an input, from the user.

Subsequently, the first biometric information included in each of the multiple preregistered pieces of user information and the first biometric information received from the first terminal unit 410 are compared, and it is decided whether or not a selection is made. The controller 140 decides whether or not each of the pieces of user information each of which includes the first biometric information is selected from among the preregistered pieces of user information and then generates the comparison group (S450).

The predetermined distance here is set, considering the time that is necessary for the controller 140 to form the comparison group. For example, in a case where there are many preregistered pieces of user information and thus it takes a long time to form the comparison group, the predetermined distance is increased.

In a case where the controller 140 forms the comparison group, the security module 150 compares the comparison group and the biometric information that is input into the second terminal unit 420 (S470) and performs the user authentication (S480).

In a specific embodiment, the first terminal unit 410 includes a camera that captures an image. In a case where the user is positioned within the predetermined distance from the second terminal unit 420, the first terminal unit 410 captures an image of the user, and the controller 140 extracts a facial image from the image of the user and forms the comparison group using the extracted facial image. In this case, each of the preregistered pieces of user information includes a facial image of a registered user.

As described above, according to the present disclosure, the comparison group is first formed after performing the user authentication with low precision, and then the user authentication is performed with high precision using the formed comparison group. Because of this, the precision of the user authentication and a speed of the user authentication can be both increased.

The present disclosure can be implemented as computer-readable codes in a program-recorded medium. The computer readable medium includes all kinds of recording devices in which data readable by a computer system is stored. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). In addition, the computer may also include the controller 180. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An electronic device that performs multimodal biometric authentication, the device comprising:
   first and second terminals each of which includes multiple sensors formed to detect biometric information and which are configured to receive different types of pieces of biometric information, respectively;
   a controller that:
     selects one or several pieces of user information from among multiple preregistered pieces of user information using the biometric information which is input from the first terminal unit, each of the preregistered pieces of user information including first biometric information and second biometric information different in type from the first biometric information;
     selects the user information including the biometric information received from the first terminal that has a level of similarity which is at or above a preset threshold; and
     forms a comparison group for user authentication; and
   a security module that compares the comparison group and the biometric information which is input from the second terminal unit and thus performs the user authentication,
   wherein the second terminal unit receives the biometric information from a user after a predetermined time elapses from when the biometric information is input into the first terminal unit,
   wherein the controller compares the first biometric information included in each of the multiple preregistered pieces of user information, and the biometric information that is input from the first terminal unit and thus forms the comparison group, and
   wherein the security module compares user information of the comparison group selected during a time from when the user information is input into the second terminal unit to when formation of the comparison group is completed and the biometric information is input into the second terminal unit.

2. The electronic device of claim 1,
   wherein, in a case where the user is positioned within a predetermined distance from the second terminal unit, the first terminal unit receives the biometric information, as an input, from the user.

3. The electronic device of claim 2,
   wherein, in a case where the user within the predetermined distance from the second terminal unit moves toward the second terminal unit and where the movement is detected, the first terminal unit receives the biometric information, as an input, from the user.

4. The electronic device of claim 1,
   wherein, in a case where the user is positioned within the predetermined distance from the second terminal unit, the first terminal unit captures an image of the user, and the controller extracts a facial image from the image of the user and forms the comparison group using the extracted facial image.

5. The electronic device of claim 1,
   wherein, in a case where the formation of the comparison group is not completed during the time from when the user's biometric information is input into the first terminal unit to when the user's biometric information is input into the second terminal unit, the security module compares the user information selected during the time from when the user's biometric information is input into the first terminal unit to when the user's biometric information is input into the second terminal unit, and the biometric information is input into the second terminal unit, and then compares the user information selected during the time from when the user's biometric information is input into the second terminal unit to when the formation of the comparison group is completed, and the biometric information is input into the second terminal unit.

6. A method for multimodal biometric authentication performed by an electronic device, the device comprising first and second terminals each of which includes multiple sensors formed to detect biometric information and which are configured to receive different types of pieces of biometric information, respectively, the method comprising:
   selecting one or several pieces of user information from among multiple preregistered pieces of user information using the biometric information which is input from the first terminal unit, each of the preregistered pieces of user information including first biometric information and second biometric information different in type from the first biometric information;
   selecting the user information including the biometric information received from the first terminal that has a level of similarity which is at or above a preset threshold; and forming a comparison group for user authentication; and comparing the comparison group and the biometric information which is input from the second terminal unit and thus performs the user authentication, wherein the second terminal unit receives the biometric information from a user after a predetermined time elapses from when the biometric information is input into the first terminal unit, wherein the controller compares the first biometric information included in each of the multiple preregistered pieces of user information, and the biometric information that is input from the first terminal unit and thus forms the comparison group, and wherein the comparing includes comparing user information of the comparison group selected during a time from when the user information is input into the second terminal unit to when formation of the comparison group is completed and the biometric information is input into the second terminal unit.

* * * * *